US009927995B2

(12) United States Patent
Ekdahl et al.

(10) Patent No.: US 9,927,995 B2
(45) Date of Patent: Mar. 27, 2018

(54) METHOD AND AN INTEGRATED CIRCUIT FOR EXECUTING A TRUSTED APPLICATION WITHIN A TRUSTED RUNTIME ENVIRONMENT

(71) Applicant: Telefonaktiebolaget L M Ericsson (publ), Stockholm (SE)

(72) Inventors: Patrik Ekdahl, Dalby (SE); Arash Vahidi, Staffanstorp (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 40 days.

(21) Appl. No.: 14/898,853

(22) PCT Filed: Jun. 19, 2013

(86) PCT No.: PCT/SE2013/050727
§ 371 (c)(1),
(2) Date: Dec. 16, 2015

(87) PCT Pub. No.: WO2014/204363
PCT Pub. Date: Dec. 24, 2014

(65) Prior Publication Data
US 2016/0139846 A1    May 19, 2016

(51) Int. Cl.
*G06F 12/00* (2006.01)
*G06F 13/00* (2006.01)
(Continued)

(52) U.S. Cl.
CPC .......... *G06F 3/0622* (2013.01); *G06F 3/0637* (2013.01); *G06F 3/0647* (2013.01);
(Continued)

(58) Field of Classification Search
CPC ...... G06F 3/0601; G06F 3/0602; G06F 3/062; G06F 3/0622; G06F 3/0628;
(Continued)

(56) References Cited

U.S. PATENT DOCUMENTS 5,892,900 A * 4/1999 Ginter .................... G06F 21/10
726/26
7,120,771 B2 * 10/2006 Dahan .................. G06F 9/30047
711/163
(Continued)

FOREIGN PATENT DOCUMENTS

EP    1 329 787 A2    7/2003

OTHER PUBLICATIONS

CaSE: Cache-Assisted Secure Execution on ARM Processors; Zhang et al; IEEE Symposium on Security and Privacy; May 22-26, 2016; pp. 72-90 (19 pages) (Year: 2016).*
(Continued)

*Primary Examiner* — Daniel C Chappell
(74) *Attorney, Agent, or Firm* — Rothwell, Figg, Ernst & Manbeck, P.C.

(57) ABSTRACT

A method and an integrated circuit (100) for executing a trusted application within a trusted runtime environment (103) of the integrated circuit (100) are disclosed. The integrated circuit (100) comprises an internal memory (101) and the integrated circuit (100) is connected to an external memory (102). The trusted runtime environment (103) is restricted to use the internal memory (101) and the external memory (102). The integrated circuit (100) identifies (201) a call, by the trusted application, to a command of the trusted runtime environment (103). The trusted runtime environment (103) allows the command to be executed when the trusted application resides in the internal memory (101) only. Next, the integrated circuit (100) executes (204) the command while using the internal memory (101) only.

20 Claims, 1 Drawing Sheet

(51) Int. Cl.
*G06F 13/28* (2006.01)
*G06F 3/06* (2006.01)
*G06F 21/53* (2013.01)
*G06F 21/74* (2013.01)
*G06F 12/14* (2006.01)

(52) U.S. Cl.
CPC ........ *G06F 3/0683* (2013.01); *G06F 12/1491* (2013.01); *G06F 21/53* (2013.01); *G06F 21/74* (2013.01)

(58) Field of Classification Search
CPC .... G06F 3/0629; G06F 3/0637; G06F 3/0646; G06F 3/0647; G06F 3/0649; G06F 3/0668; G06F 3/067; G06F 3/0671; G06F 3/0673; G06F 3/0674; G06F 3/0676; G06F 3/0677; G06F 3/0679; G06F 3/068; G06F 3/0682; G06F 3/0683; G06F 3/0685; G06F 3/0688; G06F 6/0689; G06F 12/14; G06F 12/1458; G06F 12/1466; G06F 12/1475; G06F 12/1483; G06F 12/1491; G06F 21/00; G06F 21/50; G06F 21/53; G06F 21/54; G06F 21/55; G06F 21/56; G06F 21/60; G06F 21/74; G06F 21/78; G06F 2221/2105
See application file for complete search history.

(56) References Cited

U.S. PATENT DOCUMENTS

| | | | | |
|---|---|---|---|---|
| 7,137,016 B2* | 11/2006 | Nalawadi | ............ | G06F 9/44594 713/300 |
| 7,380,136 B2* | 5/2008 | Zimmer | ................ | G06F 21/575 713/193 |
| 7,383,587 B2* | 6/2008 | Watt | ........................ | G06F 21/74 710/261 |
| 7,788,433 B2* | 8/2010 | Henry | ..................... | G06F 21/72 710/261 |
| 7,849,310 B2* | 12/2010 | Watt | ...................... | G06F 9/3012 713/150 |
| 7,917,753 B2* | 3/2011 | Asal | ........................ | G06F 21/74 713/164 |
| RE43,103 E * | 1/2012 | Rozman | ................... | G06F 21/53 709/225 |
| 8,332,653 B2* | 12/2012 | Buer | ...................... | G06F 21/575 380/277 |
| 8,473,754 B2* | 6/2013 | Jones | ..................... | G06F 21/72 380/277 |
| 8,479,022 B2* | 7/2013 | Dahan | ..................... | G06F 9/4425 713/189 |
| 8,694,795 B1* | 4/2014 | Aissi | ........................ | G06F 21/30 713/187 |
| 8,707,056 B2* | 4/2014 | Felton | ..................... | G06F 21/64 713/189 |
| 8,819,399 B1* | 8/2014 | Muth | ...................... | G06F 21/53 712/220 |
| 8,949,929 B2* | 2/2015 | Kelly | ...................... | G06F 21/53 455/410 |
| 9,588,776 B2* | 3/2017 | Smeets | ................... | G06F 21/57 |
| 2003/0226031 A1* | 12/2003 | Proudler | ................ | G06F 21/57 726/16 |
| 2004/0103299 A1* | 5/2004 | Zimmer | ................. | G06F 21/57 726/26 |
| 2004/0111578 A1* | 6/2004 | Goodman | .............. | G06F 21/53 711/163 |
| 2005/0223221 A1* | 10/2005 | Proudler | ................ | G06F 21/57 713/164 |
| 2006/0090084 A1* | 4/2006 | Buer | ...................... | G06F 21/53 713/189 |
| 2007/0136570 A1* | 6/2007 | Frank | .................... | G06F 21/572 713/2 |
| 2007/0150884 A1* | 6/2007 | Jogand-Coulomb | ... | G06F 9/445 717/174 |
| 2009/0183009 A1 | 7/2009 | Delfs et al. | | |
| 2009/0217050 A1 | 8/2009 | Amiel et al. | | |
| 2009/0240923 A1* | 9/2009 | Covey | ................. | G06F 9/30167 712/220 |
| 2011/0246698 A1* | 10/2011 | Warrier | ............... | G06F 12/1433 711/6 |
| 2012/0331550 A1* | 12/2012 | Raj | ........................ | G06F 21/575 726/22 |
| 2013/0031374 A1* | 1/2013 | Thom | ..................... | G06F 21/57 713/189 |
| 2014/0004825 A1* | 1/2014 | Prakash | ................ | H04W 12/06 455/411 |
| 2014/0115580 A1* | 4/2014 | Kellerman | ......... | H04N 21/4437 718/1 |
| 2015/0199510 A1* | 7/2015 | Krstic | .................... | G06F 21/53 713/189 |

OTHER PUBLICATIONS

SAFER PATH: Security architecture using fragmented execution and replication for protection against trojaned hardware; Beaumont et al; Design, Automation & Test in Europe Conference & Exhibition; Mar. 12-16, 2012 (6 pages) (Year: 2012).*
Poster: TVisor—A Practical and Lightweight Mobile Red-Green Dual-OS Architecture; Li et al; Proceedings of the 13th Annual International Conference on Mobile Systems, Applications, and Services; May 18-22, 2015; p. 485 (1 page) (Year: 2015).*
Arash Vahidi et al., "VETE: Virtualizing the Trusted Execution Environment," SICS Technical Report T2013:02, ID code: 5456, Mar. 2013, ISSN 1100-3154, pp. 1-35.
Ekberg, Jan-Erik "Securing Software Architectures for Trusted Processor Environments", Aalto University, Doctoral Dissertations 75/2013, May 2013, 92 pages.
International Search Report and Written Opinion issued in corresponding International application No. PCT/SE2013/050727, dated Mar. 5, 2014, 11 pages.

* cited by examiner

METHOD AND AN INTEGRATED CIRCUIT FOR EXECUTING A TRUSTED APPLICATION WITHIN A TRUSTED RUNTIME ENVIRONMENT

CROSS REFERENCE TO RELATED APPLICATION(S)

This application is a 35 U.S.C. § 371 National Phase Entry Application from PCT/SE2013/050727, filed Jun. 19, 2013, designating the United States, the disclosure of which is incorporated by reference.

TECHNICAL FIELD

Embodiments herein relate to memory management in trusted runtime environments. In particular, a method and an integrated circuit for executing a trusted application within a trusted runtime environment of the integrated circuit are disclosed.

BACKGROUND

Trusted runtime environments are employed in modern System-on-Chip (SoC) architectures developed by for example ARM. In a SoC architecture an isolation technology, such as TrustZone, may be used to separate applications handling sensitive data from other application handling non-sensitive data. The applications handling sensitive data may be referred to as trusted applications. In this context, the isolation technology provides a Trusted Execution Environment (TEE), in which the trusted application may be executed, and a Rich Execution Environment (REE), in which other applications may be executed. The REE may be exemplified by operating systems like Linux, Android and the like. The TEE may be a minimal secure OS running various cryptographic services as Trusted Applications.

The SoC architectures can be implemented in an Application Specific Integrated Circuit (ASIC) in a mobile device. The ASIC often has a very small internal memory, arranged inside the ASIC itself, in order to allow valuable on-chip space to be used for other purposes. External to the ASIC, there are however much larger external memories, or only one external memory. It is often desired to store sensitive data on the internal memory, since this result in higher security due to that the sensitive data never leaves the ASIC. For an attacker, attempting to violate the sensitive data, it is much more difficult to try to extract content from the internal memory as compared to extract content from the external memory. Moreover, the internal memory is available as soon as the ASIC is powered on. In contrast, the external memory needs to be separately powered on, which may be disadvantageous in view of power consumption.

As previously mentioned, the internal memory is limited. Thus, at many times the trusted execution environment must engage the external memory to handle several trusted applications running in parallel. This presents a security problem, since the trusted applications are handling sensitive keys and data in the external memory, which as mentioned may be violated more easily.

SUMMARY

An object is to improve trusted runtime environments, such as the trusted execution environment of the above mentioned kind.

According to an aspect, the object is achieved by a method, performed by an integrated circuit, for executing a trusted application within a trusted runtime environment of the integrated circuit. The integrated circuit comprises an internal memory. The integrated circuit is connected to an external memory. The trusted runtime environment is restricted to use the internal memory and the external memory. The integrated circuit identifies a call, by the trusted application, to a command of the trusted runtime environment. The trusted runtime environment allows the command to be executed when the trusted application resides in the internal memory only. The integrated circuit executes the command while using the internal memory only.

According to another aspect, the object is achieved by an integrated circuit configured to execute a trusted application within a trusted runtime environment of the integrated circuit. The integrated circuit comprises an internal memory. The integrated circuit is connected to an external memory. The trusted runtime environment is restricted to use the internal memory and the external memory. The integrated circuit comprises a processing circuit configured, by the trusted execution environment, to identify a call, by the trusted application, to a command of the trusted runtime environment. The trusted runtime environment allows the command to be executed when the trusted application resides in the internal memory only. Furthermore, the processing circuit is configured, by the trusted execution environment, to execute the command while using the internal memory only.

The integrated circuit is able to detect, or identify, the command for which use of only the internal memory is required. A requirement of using only the internal memory when executing the command is determined by, or defined by, the trusted runtime environment. On detection of the command, the integrated circuit may for example ensure that the trusted application is loaded into the internal memory if the trusted application resides in the external memory. Then, e.g. after loading the trusted application into internal memory, the command is executed while using the internal memory only. Since only the internal memory is used, as opposed to the external memory, security is increased. Typically, security is increased because it is more cumbersome to gain access to the internal memory than to the external memory if unauthorized access to the memory is attempted by for example an unauthorized user. Hence, fraud may be prevented or at least reduced. As a result, the above mentioned object is achieved.

An advantage is that the trusted runtime environment is made more resource efficient in terms of used internal memory, such as on-SoC memory.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
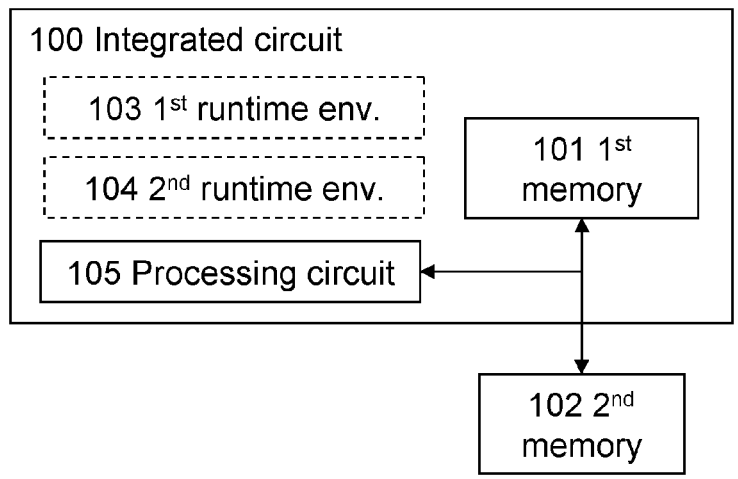
FIG. 1 is a block diagram illustrating embodiments of the integrated circuit.

Throughout the following description similar reference numerals have been used to denote similar elements, units, modules, circuits, nodes, parts, items or features, when applicable.

FIG. 1 depicts an exemplifying integrated circuit 100 according to embodiments herein. The integrated circuit 100 comprises an internal memory 101, shown as "a first memory" in FIG. 1. The internal memory 101 may be an on-SoC memory, or a portion thereof. This means that the internal memory 101 is physically located in, or on, the integrated circuit 100, which may be an Application Specific Integrated Circuit (ASIC) or the like.

Moreover, the integrated circuit 100 is connected to an external memory 102, shown as "a second memory" in FIG. 1. The external memory 102 is arranged external to the integrated circuit 100. As an example, the integrated circuit 100 and the external memory 102 may be arranged on a Printed Circuit Board (PCB).

As used herein, the term "memory" may refer to flash memory, random access memory (RAM) the like.

A trusted runtime environment 103 of the integrated circuit 100 is restricted to use the internal memory 101 and the external memory 102. The trusted runtime environment 103 is shown as "a first runtime environment" in FIG. 1. The trusted runtime environment 103 may be said to be trusted in that no other runtime environment is able to, or even allowed to, directly access the internal memory 101 and the external memory 102. Expressed differently, the internal memory 101 may be arranged to allow access from the trusted runtime environment 103 only. Therefore, the internal memory 101 may be said to be a secured internal memory. Moreover, the external memory 102 is arranged to allow access from the trusted runtime environment 103 only. Hence, the external memory 102 may be said to be a secured external memory.

Additionally, a second runtime environment 104 of the integrated circuit 100 is shown. The second runtime environment may be an operating system, such as Android, WindowsPhone Operating System, iOS or the like. The internal and external memories 101, 102 are arranged to prevent the second runtime environment 104 from being able to directly access the internal and external memories 101, 102. In some examples, the second runtime environment 104 may be able to access the internal and external memories via a so called client Application Programming Interface (API) of the trusted runtime environment.

In this context, it may be noted that the internal memory 101 and the external memory 102 have been used to refer to memory portions that are dedicated to be accessible from the trusted runtime environment 103. However, a common internal memory (not shown) may comprise the internal memory 101 and a general internal memory (not shown). The general internal memory may, thus, be freely accessible by the second runtime environment 104. Similarly, a common external memory (not shown) may comprise the external memory 102 and a general external memory (not shown). The general external memory may, thus, be freely accessible by the second runtime environment 104.

The general external memory and the external memory may be portions of the same memory component, which may be mounted on the PCB, or there may be a separate memory component for each of the general external memory and the external memory. The general external memory may be non-encrypted and the external memory may be encrypted.

As an example, the internal memory 101 may be a dedicated internal memory in that the internal memory 101 is dedicated to be accessed from the trusted runtime environment 103 only as mentioned above. This means that the internal memory 101 may be comprised in an on-SoC memory, i.e. the common internal memory, which also comprises memory portions that are freely accessible by the second runtime environment 104, i.e. the general internal memory.

Furthermore, the integrated circuit 100 comprises a processing circuit 105 configured, for example by the trusted execution environment 103, to perform various embodiments as disclosed with reference to FIG. 2 below.

Figure 2:
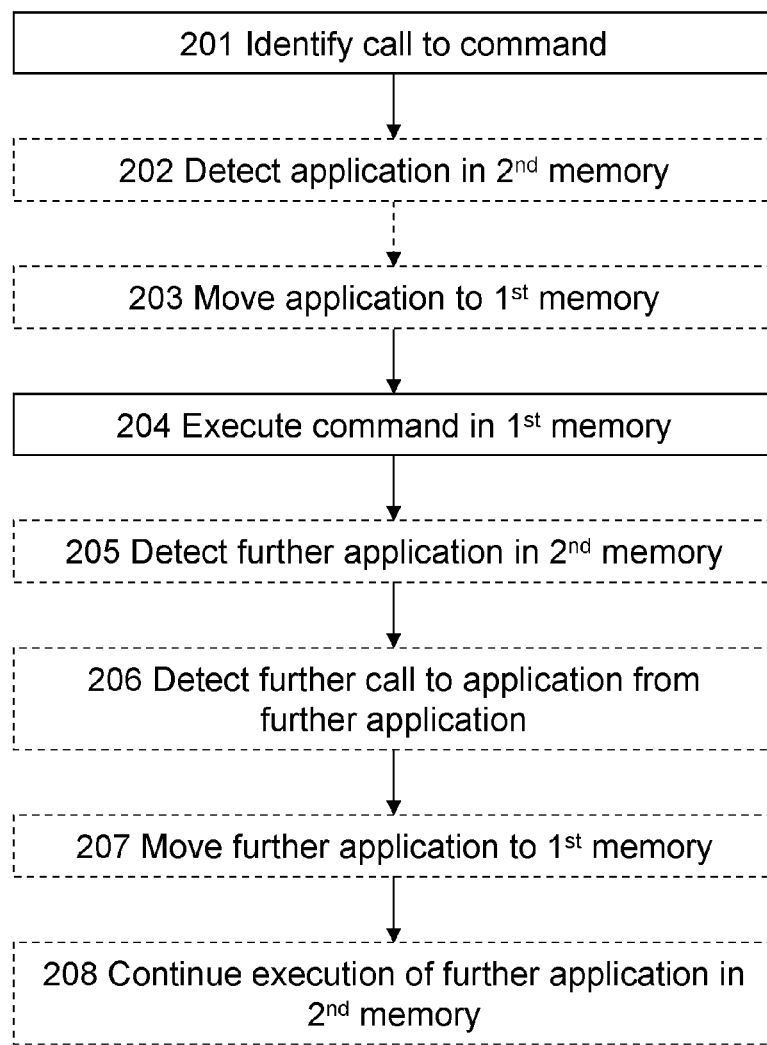
FIG. 2 is a flowchart illustrating embodiments of the method in the integrated circuit.

FIG. 2 depicts an exemplifying, schematic flowchart of embodiments of the method in the integrated circuit 100. Hence, the integrated circuit 100 performs a method for executing a trusted application within the trusted runtime environment 103 of the integrated circuit 100. The trusted application may be executed while using only the internal and external memories 101, 102 unless otherwise described.

As mentioned, the integrated circuit 100 comprises an internal memory 101. The integrated circuit 100 is connected to an external memory 102. The trusted runtime environment 103 is restricted to use the internal memory 101 and the external memory 102.

Thanks to the method described in the following an intelligent control of usage of the internal and external memory when the trusted application is executed is provided. For example, the trusted application may be placed in, or allocated into, the internal memory only when actually comprising sensitive data. Hence, the trusted application does only occupy precious space in the internal memory when required. Hence, at many times the internal memory is offloaded, i.e. when the trusted application does not comprise any sensitive data.

Advantageously, according to embodiments herein use of the internal memory is fully dynamic depending on which commands are actually executed at a certain time instant. The trusted execution environment may achieve increased security and improved performance, in terms of using the internal memory only when sensitive data is processed, dynamically without making changes to the trusted applications. This means that the trusted runtime environment performs memory management, such as deciding which of the internal and external memory to use, based on which commands is about to be executed and/or based on whether or not sensitive data is about to be processed.

The following actions may be performed in any suitable order. Actions that appear in some embodiments are indicated by dashed lines in FIG. 2.

Action 201

The integrated circuit 100 identifies a call, by the trusted application, to a command of the trusted runtime environment 103. The trusted runtime environment 103 allows the command to be executed when the trusted application resides in the internal memory 101 only.

The trusted runtime environment 103 may define a set of commands, including the command. The set of commands is required to use, or be executed in, the internal memory 101 only. The set of commands may be a set of trusted, or dedicated, commands, where the trusted commands may be restricted by the trusted runtime environment in that the trusted commands may only be executed in the internal memory. Therefore, when the integrated circuit 100 identifies the call to one of these trusted commands certain actions may need to be performed as described in for example action 204.

Action 202

Preferably, before the execution of the command as in in action 204 below, the integrated circuit 100 may according to some embodiments detect that the trusted application resides in the external memory 102. In this manner, the integrated circuit 100 is able to perform action 203 below only when necessary, i.e. when the trusted application does not reside in the internal memory 101.

Action 203

Continuing with the embodiments as described in action 202, the integrated circuit 100 may move the trusted application to the internal memory 101.

Action 204

While the integrated circuit 100 may have ensured that the trusted application resides in the internal memory 101, the integrated circuit 100 executes the command while using the internal memory 101 only.

Action 205

In some embodiments, a further trusted application may be executed in the trusted runtime environment 103. As an example, the trusted application may manage a secure storage containing cryptographic keys and the further trusted application may operate an encryption service implementing a non-proprietary encryption algorithm, such as Advanced Encryption Standard (AES).

In these embodiments, the trusted runtime environment may allow the trusted application to be executed when the trusted application resides in the internal memory 101 only. That is to say the entire trusted application is required to be executed solely while using the internal memory 101. In contrast, the further trusted application may be executed while using only the internal and external memories 101, 102. Notably, the further trusted application may use the external memory 102, which is not as secure as the internal memory 101. Accordingly, there is a difference in security between the trusted application and the further trusted application.

The integrated circuit 100 may detect that the further trusted application resides in the external memory 102.

Action 206

The integrated circuit 100 may detect a further call, by the further trusted application, to the trusted application. Action 206 may also be performed before action 205. For example, the further trusted application may request the cryptographic keys from the trusted application. As an example, a response from the trusted application will include sensitive data. Hence, the trusted runtime environment 103 will transparently perform action 207.

After action 205 and 206 have been performed in any order, the integrated circuit 100 may perform action 207 and 208 to take appropriate measures.

Action 207

The integrated circuit 100 may move the further trusted application to the internal memory 101.

Action 208

Since it now has been ensured, thanks to actions 205-207, that the internal memory 101 will be used when calling the trusted application, the integrated circuit 100 may continue execution of the further trusted application in the internal memory 101. For example, the further trusted application may request, i.e. call the trusted application, the cryptographic keys from the trusted application. In this manner, the further trusted application will receive the cryptographic keys and will continue to run as it nothing has happened. The fact that it has been moved to internal memory 101 is not visible to it.

At a later stage, for example when the further application about to terminated, or is about to go to into idle, the further trusted application may request the trusted runtime environment to clear the further trusted application from the internal memory, for example by being restored into the external memory 102.

According to the embodiments described above, the trusted runtime environment 103 may distinguish sensitive and non-sensitive data, or codes, applications and the like, in its internal memory. Therefore, the trusted runtime environment may proceed by discarding non-sensitive data/code and applying some other strategy for sensitive data/code. If necessary, an encrypted external memory may be provided for sensitive data/code in order to allow the trusted runtime environment to move sensitive data/code from the internal memory when required.

Now consider the following source code example, in which variables "key" and "plaintext" are allocated on the heap by means of "malloc"-function.

```
char *func1(char *ciphertext)
{
    char *key;
    char *plaintext;
    key = malloc(KEY_SIZE);
    plaintext = malloc(BLOCK_SIZE);
    read_from_trusted_storage(key,
KEY_IDENTIFIER, KEY_SIZE);
    decrypt(ciphertext, plaintext, key);
    free(key);
    return(plaintext);
}
```

In this example, the command that is recognized, and detected, by the trusted runtime environment is "malloc". In other example, the command may be "memmov", "memcpy" or the like.

In another example, the trusted runtime environment recognizes that "read_from_trusted_storage" is filling a memory area ("key") with data that has been securely stored. Hence, the memory to which the variable "key points should be internal memory. During the execution of the "read_from_trusted_storage" function, the trusted runtime environment checks that the memory for the return value ("key") is in internal memory and if not it will move it there. Same with the decryption function. It will automatically move the memory location to which the variable "plaintext" points to internal memory in order to protect the plaintext. This functionality is enabled by the trusted runtime environment because it can be aware of the security levels of return variables from functions within its defined internal API. That is to say the set of commands includes a portion of the API.

Returning to FIG. 1, the integrated circuit 100 is configured to perform the method in FIG. 2. Thus, the integrated circuit 100 is configured to execute the trusted application within the trusted runtime environment 103 of the integrated circuit 100.

The processing circuit 105 is configured, by the trusted execution environment 103, to identify a call, by the trusted application, to a command of the trusted runtime environment 103. The trusted runtime environment 103 allows the command to be executed when the trusted application resides in the internal memory 101 only. Furthermore, the processing circuit 105 is configured, by the trusted execution environment 103, to execute the command while using the internal memory 101 only.

Furthermore, the processing circuit 105 may be configured to detect that the trusted application resides in the external memory 102, and to move the trusted application to the internal memory 101. The trusted application may be executable while using only the internal and external memories 101, 102.

The trusted runtime environment 103 may be configured to define a set of commands, including the command, wherein the set of commands is required to use the internal memory 101 only.

As mentioned, the internal memory 101 may be a secured internal memory. The secured internal memory may be arranged to allow access from the trusted runtime environment 103 only.

As mentioned, the external memory 102 may be a secured external memory. The secured external memory may be arranged to allow access from the trusted runtime environment 103 only.

In some embodiments, a further trusted application may be executed in the trusted runtime environment 103. The further trusted application may be executable while using only the internal and external memories 101, 102. The trusted runtime environment allows the trusted application to be executed when the trusted application resides in the internal memory 101 only. In these embodiments, the processing circuit 105 may be configured to detect that the further trusted application resides in the external memory 102, to detect a further call, by the further trusted application, to the trusted application, to move the further trusted application to the internal memory 101, and to continue execution of the further trusted application in the internal memory.

The processing circuit 105 comprises one or more processor cores of the integrated circuit. Sometimes a processor core may be referred to as a processor kernel.

As used herein, the term "processing circuit" may be a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software or hardware module. Any such module may be a determining means, estimating means, capturing means, associating means, comparing means, identification means, selecting means, receiving means, transmitting means or the like as disclosed herein. As an example, the expression "means" may be a unit, such as a determining unit, selecting unit, etc.

As used herein, the expression "configured to" may be that a processing circuit is configured to, or adapted to, by means of software or hardware configuration, perform one or more of the actions described herein.

The internal and/or external memories 101, 102 may be used for storing software to be executed by, for example, the processing circuit 105. The software may comprise instructions to enable the integrated circuit 100 to perform the method as described above in conjunction with FIG. 2.

Alternatively or additionally, in a further embodiment of how to manage use of the internal memory, a number of compile-time properties, such the security level of code and heap memory and so on, may be utilized to control use of the internal memory. This means that the programmer inserts into a source code of the trusted application so called compiler directives, such as the exemplifying expression "#pragma security-level-data-on-soc" in the example below.

The compile time properties set access, and use of, the internal memory. For example a trusted application implementing a proprietary Digital Rights Management (DRM) algorithm may only reside in and access the internal memory.

A source code example of compile time memory management is provided here:

```
#pragma security-level-data-on-soc
char *func1(char *ciphertext)
{
    char key[32];
    char *plaintext;
    plaintext = malloc(BLOCK_SIZE);
    read_from_trusted_storage(key,
KEY_IDENTIFIER, KEY_SIZE);
    decrypt(ciphertext, plaintext, key);
    return(plaintext);
}
#pragma security-level-default
```

The function "func1" will, due to the #pragma compiler directive, allocate it's stack in on-SoC memory, i.e. the internal memory, whereby the local variable "key" will be in a well-defined secure memory.

Also "malloc" will allocate heap memory in on-SoC memory and thus the memory to which the variable "plaintext" is pointing will be in a well-defined secure memory.

The mechanism that enables the compile time memory management is found in the c library which works closely together with the trusted runtime environment. This will enable the compiler to choose the right internal malloc function and provide the necessary parameters to the library in order to place the memory where the programmer requests.

These security properties may change during run-time, as a result of a trusted application accessing some object or resource that requires use of the internal memory, but also as a result of direct request by the trusted application. The TEE supervises all such changes and takes appropriate action when needed. This is probably best illustrated with the example:

For reference, an extension to the commonly known "malloc" function may be used when implementing the embodiments herein. See GlobalPlatform Document GPD_SPE_010, "TEE Internal API Specification", published at http://www.globalplatform.org/specificationform.asp-?fid=7762. In this specification the malloc function is extended with a second parameter denoted "hint".

The description of "malloc" from the specification follows here:

void* TEE_Malloc(size_t size, uint32_t hint)

Description

The TEE_Malloc function allocates space for an object whose size in bytes is specified in the parameter size.

The pointer returned is guaranteed to be aligned such that it may be assigned as a pointer to any of the basic C types.

The parameter hint is a hint to the allocator. In this version of the specification, only one hint is defined. This parameter is nonetheless included so that the Trusted Applications may refer to various pools of memory or request special characteristics for the allocated memory by using an implementation-defined hint. Future versions of this specification may introduce additional standard hints.

The hint must be attached to the allocated block and should be used when the block is reallocated with TEE_Realloc.

If the space cannot be allocated, a NULL pointer is returned.

Parameter size: The size of the buffer to be allocated. •hint: A hint to the allocator. Currently defined values are as follows:

The default value, 0, guarantees that the returned block of memory is filled with zeros.

Values in the range [0x00000001, 0x7FFFFFFF] are reserved for future version of this specification.

Values in the range [0x80000000, 0xFFFFFFFF] can be used for implementation-defined hints.

Return Value

Upon successful completion, with size not equal to zero, the function returns a pointer to the allocated space. If the space cannot be allocated, a NULL pointer is returned.

If the size of the requested space is zero, the value returned is undefined but guaranteed to be different from NULL and MUST NOT be accessed by the Trusted Application.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an integrated circuit, for executing a trusted application within a trusted runtime environment of the integrated circuit, wherein the integrated circuit comprises an internal memory, and wherein the integrated circuit is connected to an external memory, wherein the trusted runtime environment is restricted to use the internal memory and the external memory, wherein the method comprises:
   identifying a call, by the trusted application, to execute a command of the trusted runtime environment, wherein the trusted runtime environment allows the command to be executed when the trusted application resides in the internal memory only;
   in response to identifying the call, determining whether the trusted application resides in the external memory;
   after identifying the call and as a result of determining that the trusted application resides in the external memory, moving the trusted application from the external memory to the internal memory;
   after moving the trusted application from the external memory to the internal memory, executing the command while using the internal memory only;
   after executing the command and before deciding that the trusted application should be moved back to the external memory, determining whether the trusted application comprises any sensitive data; and
   as a result of determining that the trusted application does not comprise any sensitive data, deciding that the trusted application should be moved back to the external memory and then moving the trusted application back to the external memory from the internal memory.

2. The method of claim 1, wherein the trusted application is executed while using only the internal and external memories.

3. The method of claim 1, wherein the trusted runtime environment defines a set of commands, including the command, wherein the set of commands is required to use the internal memory only.

4. The method of claim 1, wherein the internal memory is a secured internal memory, wherein the secured internal memory is arranged to allow access from the trusted runtime environment only.

5. The method of claim 1, wherein the external memory is a secured external memory, wherein the secured external memory is arranged to allow access from the trusted runtime environment only.

6. The method of claim 1, wherein a further trusted application is executed in the trusted runtime environment, wherein the trusted runtime environment allows the trusted application to be executed when the trusted application resides in the internal memory only, wherein the method comprises:
   detecting that the further trusted application resides in the external memory;
   detecting a further call, by the further trusted application, to the trusted application;
   moving the further trusted application to the internal memory; and
   continuing execution of the further trusted application in the internal memory.

7. The method of claim 6, wherein the further trusted application is executed while using only the internal and external memories.

8. The method of claim 1, wherein
   the method further comprises allocating a first block of memory in response to a first memory allocation request from the trusted application,
   the trusted application includes a first memory pointer pointing to the first block of memory,
   determining whether the trusted application resides in the external memory comprises determining whether the first block of memory to which the first memory pointer points is located in the external memory, and
   moving the trusted application to the internal memory comprises allocating a second block of memory from the internal memory and adjusting the first memory pointer to point to the second block of memory.

9. The method of claim 8, wherein the command is a command to retrieve sensitive data from a storage unit and store the retrieved data in the first block of memory.

10. The method of claim 9, wherein the sensitive data is a key for use in decrypting encrypted data.

11. The method of claim 10, wherein the method further comprises:
   allocating a third block of memory in response to a second memory allocation request from the trusted application, wherein the trusted application includes a second memory pointer pointing to the third block of memory;
   identifying a second call, by the trusted application, to execute a second command of the trusted runtime environment, wherein the trusted runtime environment allows the second command to be executed when the trusted application resides in the internal memory only;
   in response to identifying the second call, determining whether the third block of memory to which the second memory pointer points is located in the external memory; and
   after identifying the second call and as a result of determining that the third block of memory to which the second memory pointer points is located in the external memory, allocating a fourth block of memory from the internal memory and adjusting the second memory pointer to point to the fourth block of memory from the internal memory.

12. The method of claim 11, wherein the second command is a command to: decrypt the encrypted data to produce plaintext data and store the plaintext data in the memory block to which the second memory pointer points.

13. The method of claim 1, wherein the command is a memory allocation command.

14. An integrated circuit configured to execute a trusted application within a trusted runtime environment of the integrated circuit, wherein the integrated circuit comprises an internal memory, and wherein the integrated circuit is connected to an external memory, wherein the trusted runtime environment is restricted to use the internal memory and the external memory, wherein the integrated circuit comprises a processing circuit configured, by the trusted execution environment, to:
   identify a call, by the trusted application, to execute a command of the trusted runtime environment, wherein the trusted runtime environment allows the command to be executed when the trusted application resides in the internal memory only;
   in response to identifying the call, determine whether the trusted application resides in the external memory;
   after identifying the call and as a result of determining that the trusted application resides in the external memory, move the trusted application from the external memory to the internal memory;
   after moving the trusted application from the external memory to the internal memory, execute the command while using the internal memory only;
   after executing the command and before deciding that the trusted application should be moved back to the external memory, determine whether the trusted application comprises any sensitive data; and
   as a result of determining that the trusted application does not comprise any sensitive data, decide that the trusted application should be moved back to the external memory and then move the trusted application back to the external memory from the internal memory.

15. The integrated circuit of claim 14, wherein the trusted application is executable while using only the internal and external memories.

16. The integrated circuit of claim 14, wherein the trusted runtime environment is configured to define a set of commands, including the command, wherein the set of commands is required to use the internal memory only.

17. The integrated circuit of claim 14, wherein the internal memory is a secured internal memory, wherein the secured internal memory is arranged to allow access from the trusted runtime environment only.

18. The integrated circuit of claim 14, wherein the external memory is a secured external memory, wherein the secured external memory is arranged to allow access from the trusted runtime environment only.

19. The integrated circuit of claim 14, wherein a further trusted application is executed in the trusted runtime environment, wherein the trusted runtime environment allows the trusted application to be executed when the trusted application resides in the internal memory only, wherein the processing circuit is configured to:
   detect that the further trusted application resides in the external memory;
   detect a further call, by the further trusted application, to the trusted application;
   move the further trusted application to the internal memory; and
   continue execution of the further trusted application in the internal memory.

20. The integrated circuit of claim 19, wherein the further trusted application is executable while using only the internal and external memories.

* * * * *